No. 748,240. PATENTED DEC. 29, 1903.
G. A. WALL.
BEARING THERMOSTAT.
APPLICATION FILED OCT. 28, 1902.
NO MODEL.
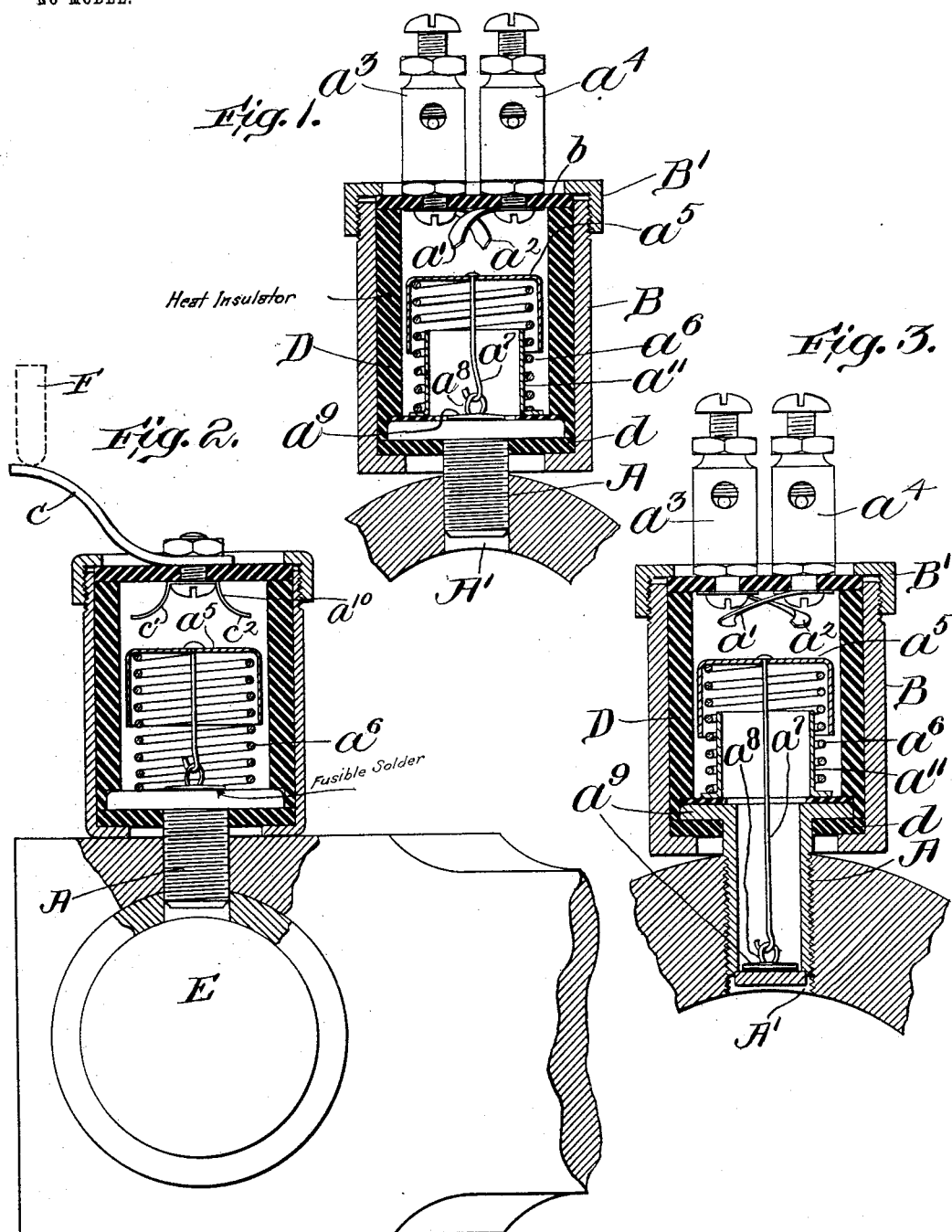
Witnesses:
Inventor:
George Augustus Wall,
by Maynadier & Rockwell,
Attorneys.

No. 748,240.

Patented December 29, 1903.

UNITED STATES PATENT OFFICE.

GEORGE AUGUSTUS WALL, OF PROVIDENCE, RHODE ISLAND.

BEARING-THERMOSTAT.

SPECIFICATION forming part of Letters Patent No. 748,240, dated December 29, 1903.

Application filed October 28, 1902. Serial No. 129,133. (No model.)

*To all whom it may concern:*

Be it known that I, GEORGE AUGUSTUS WALL, of Providence, in the county of Providence and State of Rhode Island, have invented a new and useful Bearing-Thermostat, of which the following is a specification.

My invention relates to automatic means for giving notice that a bearing is overheating; and it consists in a thermostat whose casing is provided with a tang by which it is held to the bearing and which is in such close relation to the release of the thermostat that as the bearing gets hot the tang and the release are also heated—that is, so that the tang and the bearing and the release shall always be at practically the same temperature.

Another feature of my invention is insulating the release and the inner terminals from the casing of the thermostat by a jacket of a material which is a non-conductor of heat, so that the temperature of the surrounding atmosphere does not tend to cool the release, thereby making the thermostat more sensitive.

In the drawings, Figure 1 is a sectional elevation of a portion of a bearing with one form of my thermostat in place. Fig. 2 is a like view of a bearing of a wrist-pin of a crank with another form of my thermostat in place. Fig. 3 is a view like Fig. 1, but with a bearing much thicker than that shown in Fig. 1.

In Figs. 1 and 3 the thermostat proper consists of the electrodes $a'$ $a^2$, insulated by the disk $b$, of fiber or the like, which carries the binding-posts $a^3$ $a^4$, these electrodes $a'$ $a^2$ being held in proper relation to bridge-piece $a^5$, carried by the spring $a^6$, which is held compressed by hook $a^7$ and ring $a^8$, the ring being secured to disk $a^9$. This bridge-piece $a^5$, its spring $a^6$, hook $a^7$, ring $a^8$, and disk $a^9$ or like means for holding the bridge-piece $a^5$ out of contact with electrodes $a'$ $a^2$ constitutes the release of the thermostat, for when disk $a^9$ is soldered to tang A by fusible solder it holds the spring $a^6$ under tension and the bridge-piece $a^5$ will not make contact with electrodes $a'$ $a^2$ until the fusible solder melts and releases the bridge-piece $a^5$, which is then carried into contact with electrodes $a'$ $a^2$ and completes the circuit and sounds a bell or otherwise gives notice that the temperature has risen sufficiently to melt the solder by which the bridge-piece $a^5$ was held.

My invention consists, primarily, in forming this release with a tang A, which is shown as screw-threaded and engages a bore A' in the bearing. This tang is carried by the sleeve B, and the electrodes $a'$ $a^2$, disk $b$, and binding-posts $a^3$ $a^4$ are also carried by that sleeve, the cap B' serving to hold them in place in connection with the sleeve D and washer $d$.

In Fig. 2 the parts are the same except that only one electrode $a^{10}$ is used, and hence instead of its binding-post a wiping-contact $c$ is provided and bridge-piece $a^5$ becomes an electrode.

The flanged sleeve $a^{11}$ (shown in Figs. 1 and 3) is omitted from Fig. 2, as when bridge-piece $a^5$ is a mere bridge piece, as in Figs. 1 and 3, no current flows through spring $a^6$, but when it is an electrode, as in Fig. 2, all the current flows through spring $a^6$ from tang A, which in Fig. 2 is of course in electrical connection with one pole of the battery, of which the fixed electrode F is the other pole, for in Fig. 2 the casing of the thermostat is connected by its tang A with the bearing of the wrist-pin E, which travels in a circle, and the wiper $c$ on the casing of the thermostat is brought into rubbing contact with the fixed electrode F by that travel, as will be plain. If the bearing of wrist-pin E has become overheated, the alarm-circuit will be completed as often as the wiper $c$ rubs over fixed electrode F if the heat of tang A has melted the solder holding the release of the thermostat, for the bridge-piece $a^5$ is then thrown by its spring into contact with the inner terminals $c'$ $c^2$ of the thermostat.

Another feature of my invention consists in isolating the release of the thermostat as far as practical from all conductors of heat except the tang A. The non-conducting sleeve D and washer $d$ not only hold the tang A firmly in the casing B, but also insure the temperature of tang A shall always be practically the same as the temperature of the bearing.

The thermostat shown is not claimed herein, as it forms the subject of my application filed October 28, 1902, Serial No. 129,134.

What I claim as my invention is—

1. The bearing-thermostat above described comprising a thermostat and a tang projecting from its casing to connect the thermostat and the bearing, the tang forming a part of the thermostat.

2. In combination a bearing-thermostat, a tang for connecting it with a bearing, and heat-insulating material between the tang and the casing of the thermostat, to keep the temperature of the tang near the temperature of the bearing.

GEORGE AUGUSTUS WALL.

Witnesses:
G. A. ROCKWELL,
C. B. MAYNADIER.